US008534728B1

(12) United States Patent
Bosscher et al.

(10) Patent No.: US 8,534,728 B1
(45) Date of Patent: Sep. 17, 2013

(54) ADAPTIVE ROBOTIC GRIPPER

(71) Applicant: Harris Corporation, Melbourne, FL (US)

(72) Inventors: Paul M. Bosscher, West Melbourne, FL (US); Matthew D. Summer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/680,412

(22) Filed: Nov. 19, 2012

(51) Int. Cl.
*B25J 15/10* (2006.01)

(52) U.S. Cl.
USPC ........... 294/86.4; 294/207; 294/902; 269/266

(58) Field of Classification Search
USPC ............... 294/86.4, 119.1, 207, 902; 901/37, 901/39; 269/266
See application file for complete search history.

(56) References Cited

U.S. PATENT DOCUMENTS

| 898,702 | A | | 9/1908 | Taylor |
|---|---|---|---|---|
| 975,891 | A | | 11/1910 | Prellwitz |
| 2,825,436 | A | | 3/1958 | Amtsberg |
| 3,370,213 | A | | 2/1968 | Rose |
| 4,114,464 | A | | 9/1978 | Schubert et al. |
| 4,132,318 | A | | 1/1979 | Wang et al. |
| 4,149,278 | A | | 4/1979 | Frosch et al. |
| 4,544,193 | A | | 10/1985 | Dunn et al. |
| 4,572,564 | A | * | 2/1986 | Cipolla .......................... 294/207 |
| 4,579,380 | A | | 4/1986 | Zaremsky et al. |
| 4,600,357 | A | | 7/1986 | Coules |
| 4,609,220 | A | * | 9/1986 | Scott ............................. 294/87.1 |
| 4,653,793 | A | | 3/1987 | Guinot et al. |
| 4,680,523 | A | | 7/1987 | Goumas et al. |
| 4,770,455 | A | * | 9/1988 | Collins, Jr. .................... 294/213 |
| 4,841,832 | A | | 6/1989 | Snavely et al. |
| 5,011,207 | A | * | 4/1991 | Stevens ......................... 294/207 |

(Continued)

FOREIGN PATENT DOCUMENTS

| DE | 10 2008 042261 A1 | 4/2010 |
|---|---|---|
| EP | 1 507 259 A1 | 2/2005 |
| JP | 11 320473 A | 11/1999 |
| WO | 2010 040215 A1 | 4/2010 |

OTHER PUBLICATIONS

Information about Related Patents and Patent Applications, see section 6 of the accompanying Information Disclosure Statement Letter, which concerns Related Patents and Patents Applications, Jan. 17, 2013.

(Continued)

*Primary Examiner* — Dean Kramer
(74) *Attorney, Agent, or Firm* — Fox Rothschild, LLP; Robert J. Sacco (57) ABSTRACT

A method for grasping an object includes moving a first and second gripping pad (116) respectively to first and second locations in which a first face (117) of the first gripping pad is opposed from a second face (117) of the second gripping pad and spaced apart a distance. Two or more of pins (118) included in each gripping pad are extended from at least the first face in a direction toward the second face. Thereafter, an extension distance for each of the pins is independently determined responsive to a resistance encountered by each of the pins as a result of the extending. As a result of the independently determining step, an object-defined gripping contour is provided as formed by distal ends of the pins.

20 Claims, 7 Drawing Sheets

(56) References Cited

U.S. PATENT DOCUMENTS

| | | | |
|---|---|---|---|
| 5,092,645 A | | 3/1992 | Okada |
| 5,280,981 A | | 1/1994 | Schulz |
| 5,403,057 A | * | 4/1995 | Sugito et al. ............... 294/119.1 |
| 5,407,185 A | * | 4/1995 | Zehnpfennig et al. ........ 269/266 |
| 5,992,538 A | | 11/1999 | Marcengill et al. |
| 6,217,094 B1 | | 4/2001 | Hanaduka et al. |
| 6,377,011 B1 | | 4/2002 | Ben-Ur |
| D466,780 S | | 12/2002 | Stirm |
| 7,014,235 B1 | | 3/2006 | Ostwald |
| 7,125,010 B2 | * | 10/2006 | Moore et al. ................. 269/266 |
| 7,168,748 B2 | | 1/2007 | Townsend et al. |
| 7,370,896 B2 | | 5/2008 | Anderson et al. |
| 7,513,546 B2 | * | 4/2009 | Vranish ....................... 294/86.4 |
| 2009/0014193 A1 | | 1/2009 | Barezzani et al. |
| 2010/0156127 A1 | | 6/2010 | De Kervanoael |

OTHER PUBLICATIONS

International Search Report mailed Jun. 21, 2012 in Application Serial No. PCT/US2012/027469 in the name of Harris Corporation.
International Search Report mailed Dec. 20, 2012 in International Application Serila No. PCT/US2012/049214, in the name of Harris Corporation.

* cited by examiner

ADAPTIVE ROBOTIC GRIPPER

BACKGROUND OF THE INVENTION

1. Statement of the Technical Field

The inventive arrangements relate to robotics and more particularly to robotic methods and systems for grasping objects.

2. Description of the Related Art

Systems involving robotics and telematics frequently include some means by which a machine can grasp and manipulate objects. Systems for grasping well known objects, or a limited number of object types, present a relatively straightforward design problem because a gripper design can be selected that is well suited to the particular task. Such grasping problems can be addressed with relative ease using conventional structured grasping methods. For example, grasping devices in such scenarios can have two or three solid fingers with simple geometry (flat surfaces). Alternatively, the fingers used in such simple grasping devices can have a geometry that includes a customized surface which is particularly effective for grasping objects having a specific geometry.

The design problem can be more complex with regard to devices which are expected to grasp a wider variety of objects of arbitrary shape. The absence of a priori knowledge regarding the type of object, variation in object type, variable/unknown object location and/or variable object pose can present a difficult design challenge. This difficulty is compounded by the additional need for a grasping device to have a design which is simple, robust and tolerant of poor or inaccurate sensor information. Grasping devices have been developed which include fully or partially articulated fingers that are able to grasp a wider variety of objects having different shapes. However, these types of grasping devices often require complex grasp planning and a good knowledge of the grasped object. Also, grasping devices with fully or partially articulated fingers can often require many actuators. The complexity and number of actuators tend to make such devices expensive and prone to mechanical failure.

Soft grippers are also known in the art. Soft grippers have a gripping pad formed of a pliable outer membrane which encloses a granulated media material. The gripping pad is pushed onto an object to be grasped and a vacuum is then applied to the interior of the pad. This causes the granulated media within the pad to rigidly conform the pad to the object, thereby gripping same. Soft grippers have some advantages insofar as they are able to conform to a relatively wide variety of arbitrarily shaped objects. However, they require the gripping pad to be pushed onto objects with significant force. Also, the pliable outer membrane is prone to being punctured or wearing out.

SUMMARY OF THE INVENTION

Embodiments of the invention concern a method for grasping an object. The method includes moving a first and second gripping pad respectively to first and second locations in which a first face of the first gripping pad is opposed from a second face of the second gripping pad and spaced apart a distance. Two or more of the pins are extended from at least the first face in a direction toward the second face. Thereafter, an extension distance for each of the pins is independently determined responsive to a resistance encountered by each of the pins as a result of the extending. As a result of the independently determining step, an object-defined gripping contour is provided as formed by distal ends of the pins.

The invention also concerns a system for grasping an object. The system includes first and second gripping pads. At least one mechanical linkage is provided which is responsive to a control system. The mechanical linkage is configured to move the first and the second gripping pad respectively to first and second locations in which a first face of the first gripping pad is opposed from a second face of the second gripping pad and spaced apart a distance. A fluid system is provided and configured to cause two or more pins to extend from at least the first face in a direction toward the second face. More particularly, the fluid system is configured to cause an extension distance for each of the pins to be independently determined responsive to a resistance encountered by each of the pins as a result of the extending. After the extension distance has been independently determined in this way the distal ends of the pins will have an object-defined gripping contour.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
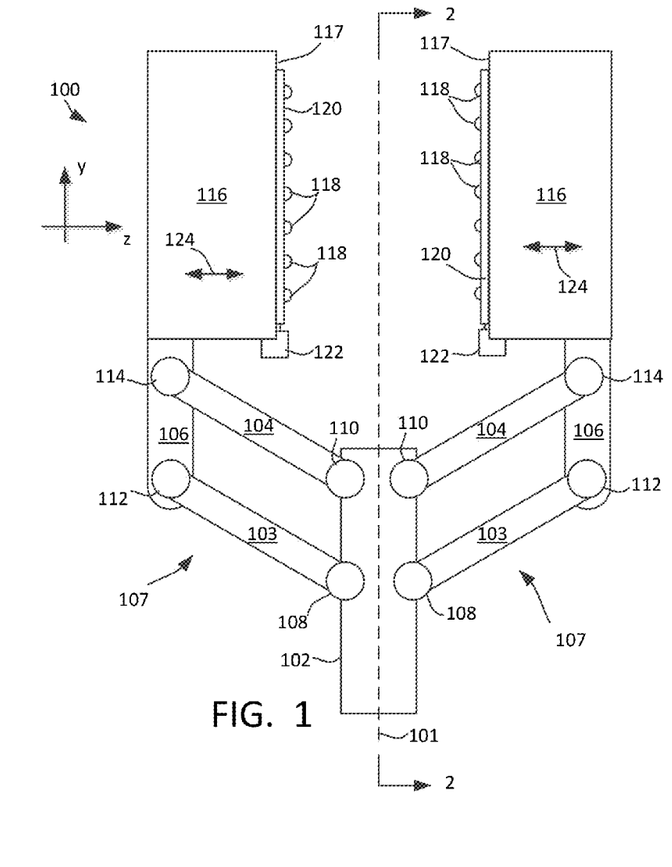
FIG. 1 is a side view of a robotic grasping device in which a pair of gripping pads are mounted to a robotic linkage.
Figure 2:
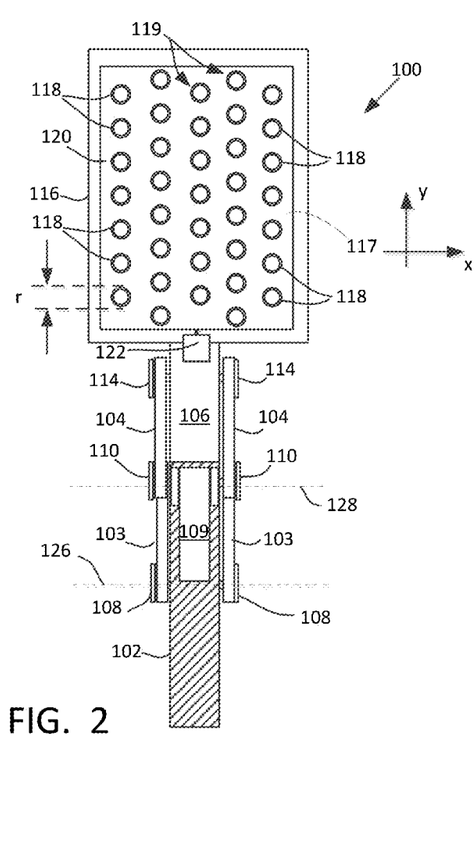
FIG. 2 is a cross-sectional view of the robotic grasping device in FIG. 1.

Referring now to FIGS. 1 and 2 there is shown a grasping device 100 comprised of a pair of gripping pads 116. The gripping pads in this embodiment are movable by means of a mechanical linkage attached to a base 102. In the embodiment illustrated, the grasping device is generally symmetric with respect to a central axis 101 and the two halves of the grasping device are substantially mirror images of one another. Accordingly, in order to avoid confusion, the same reference numerals are used to refer to the same elements present in opposing sides of the device. The two gripping pads 116 are configured so that at least one of the pads can be moved with respect to the other to vary a distance between a face 117 formed on each gripping pad. Each face can be comprised of a substantially planar surface as shown. Alternatively, it can be advantageous for each face to have a contoured surface to facilitate certain grasping tasks. For example it can be advantageous in some scenarios to have a face which is partially concave, angled or stepped. In an embodiment of the invention shown in FIGS. 1 and 2, both gripping pads are moveable, and the faces of the two gripping pads are maintained in a generally parallel orientation with respect to one another. If the gripping pads have a non-planar face, then a gripping plane can be defined for each gripping pad to facilitate parallel alignment of the two gripping pads as described herein.

Each of the gripping pads 116 includes a plurality of pins 118. Each pin is arranged so that a distal end can protrude through one of a plurality of openings arranged on each face 117. The remainder of the elongated length of each pin is generally disposed within the gripping pad. The pins are arranged so that they are distributed in two transverse directions (x, y) across a surface area defined by each face 117. For example, a multiplicity of pins 118 can be disposed across each face in a plurality of rows arranged in a first x direction, and in a plurality of columns defined in a y direction, where the x direction is generally transverse or orthogonal to the y direction. Each of the plurality of rows can include a plurality of pins. Similarly, each of the plurality of column can include a plurality of pins. For example, each row can include 3, 4, 5 or more pins 118. Similarly, each column can include 3, 4, 5 or more pins. The number of rows and columns is also not limited. Accordingly, there can be 3, 4, 5 or more rows and an equal or lesser number of columns.

The pins can be evenly distributed across the surface of each face 117 as generally shown in FIGS. 1 and 2. However, it should be understood that the invention is not limited in this regard. The distribution of the pins 118 can also be asymmetric and their distribution or density of pins per unit area can vary across the surface of each face in the x direction, the y direction or both directions. The number of pins 118 and the spacing between them will depend on a variety of factors. For example, the number of pins per unit area can depend on a particular grasping task for which the gripping pad is intended. When the grasping device is intended for smaller objects, it may be advantageous to have finer pins that have a smaller radius r, and/or to dispose the pins more closely together on each face 117. In the case of larger objects, coarser pins having a larger pin radius r may be desirable, and/or it may be advantageous to space the pins a greater distance apart.

As noted above, a spacing between the gripping pads 116 can be controlled by a mechanical linkage. One example of such a mechanical linkage 107 is illustrated in FIGS. 1 and 2. The mechanical linkage includes link elements 103, 104, pivot members 108, 110, 112, 114 and arms 106. The pivot members 108, 110, 112, 114 and link elements 103, 104 are configured to facilitate movement of the gripping pads at least in the direction shown by arrows 124. Accordingly, the gripping pads are moveable relative to each other and the linkage ensures that the faces 117 of two gripping pad are maintained in parallel alignment while a distance between the two pads is varied.

In FIGS. 1 and 2, the position of the link elements 103, 104 is advantageously controlled by one or more actuators 109. It will be appreciated that any suitable actuator can be used for this purpose provided that it is capable of causing the link elements 103, 104 to pivot respectively around axes 126 and 128. The actuator can be an hydraulic, pneumatic, or electro-mechanical device disposed within or outside the base 102. As such, the actuator can include various components such as an electric motor, a gear drive system, a hydraulic cylinder, or a pneumatic cylinder, without limitation. Also, it should be understood that the base 102 can be mounted on a robotic arm. The robotic arm in such embodiments is configured to facilitate translation movement of the base 102 in one, two or three-dimensions. Robotic arms of this type are well known in the art. Similarly, the base and/or the robotic arm can be configured to facilitate rotation of the base 102 about one, two or three orthogonal axes. Notably, in the embodiment shown in FIGS. 1 and 2, the faces 117 of the two gripping pads 116 are advantageously maintained in a generally parallel relationship as the base 102 is translated in direction or rotated.

Figure 3:
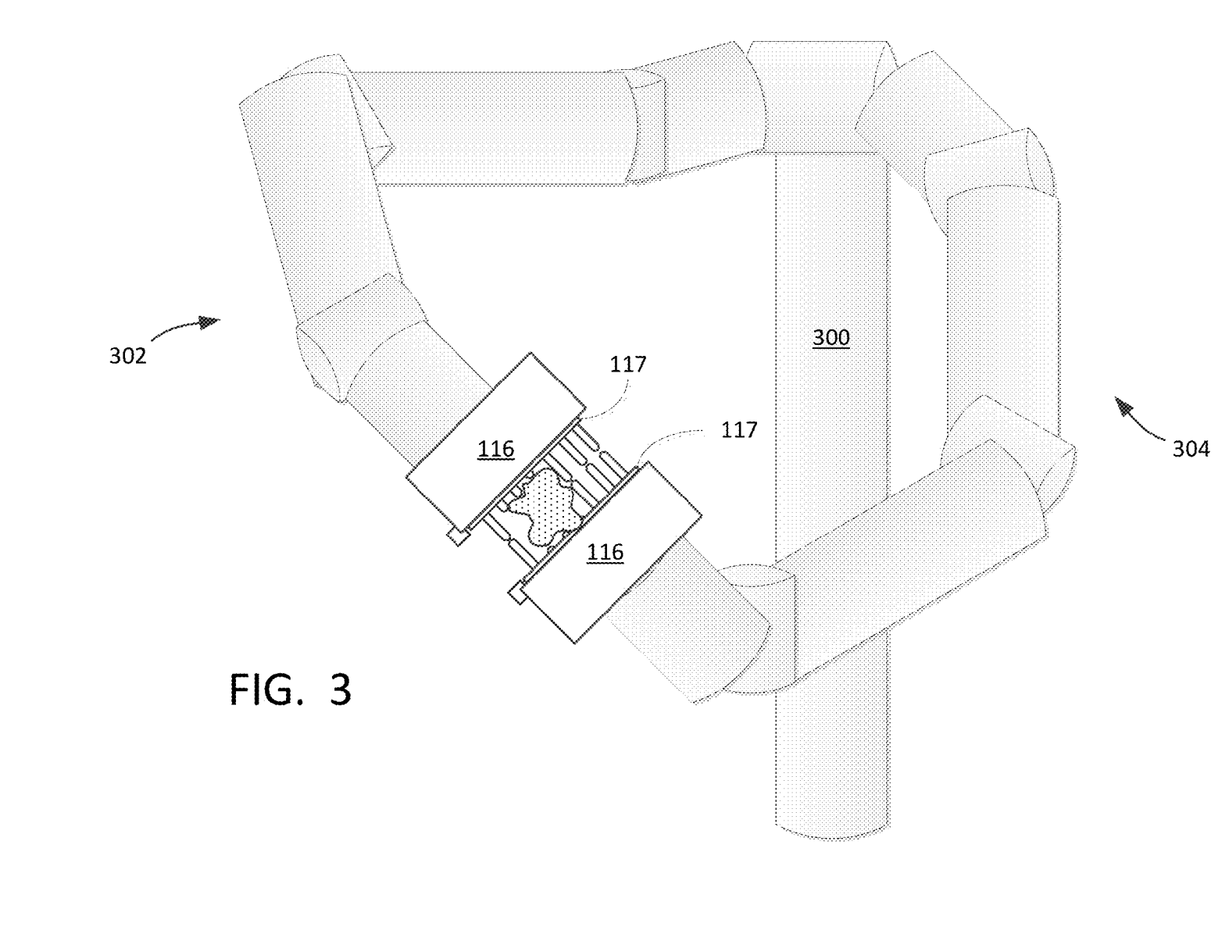
FIG. 3 is a perspective view of an alternative embodiment of a robotic grasping device in which the pair of gripping pads are respectively disposed on two movable robotic arms.

The mechanical linkage 107 shown in FIGS. 1 and 2 is one embodiment of a mechanical linkage for controlling a position of the gripping pads 116. However, it should be understood that the particular mechanical linkage is not critical to the invention. For example, instead of the mechanical linkage 107 shown in FIGS. 1 and 2, each pad 116 could be separately mounted on an end of a corresponding robotic arm. Such an arrangement is illustrated in FIG. 3. As shown therein, a robot system 300 can include two or more robotic arms 302, 304. Each of the robotic arms is advantageously configured for varying a position of the two gripping pads 116 in one, two or three orthogonal directions. The robotic arms can also be configured to facilitate rotation of each gripping pad about one, two or three orthogonal axes. Accordingly, the robotic arms, under the direction of a control system, can be arranged to position the two gripping pads 116 on opposing sides of an object to be grasped and/or to manipulate a pose of a grasped object as needed.

Notably, a position of the first and the second gripping pads 116 is preferably under the control of a suitable control system (not shown in FIG. 3) such that a face 117 of a first gripping pad 116 can be moved to a position opposed from a face 117 of the second gripping pad 116 as shown. The control system can also manipulate the first and second gripping pads so that the faces 117 of the two pads are generally spaced apart a suitable distance and oriented in a parallel relationship for grasping an object. The motion of the robotic arms can be effected by any combination of hydraulic, mechanical, and/or electro-mechanical actuators under the control of the control system. Systems for manipulating and controlling robotic arms are well known and therefore will not be described here in detail.

The gripping pads 116 will now be described in further detail with reference to FIG. 4. As shown therein, each gripping pad 116 includes at least one chamber or plenum 414 within which the pins 118 are disposed. Each pin 118 has an elongated length which extends from a proximal end 504 retained inside the plenum 414, to a distal end 502 which can extend outside the plenum. For example, the distal end can extend out of the plenum and through the face 117 of each gripping pad. The proximal end of each pin 504 can include a retainer 426 which is generally configured to prevent the pin from extending beyond the face 117. A fluid 412 is contained with each plenum and generally fills the interior space defined by the plenum. A seal (not shown in FIG. 4) is advantageously provided around each pin where it transitions through a wall of the plenum to prevent fluid from seeping out around the perimeter of each pin.

A pressure of the fluid 412 contained within each plenum is determined by a control system 400. According to one embodiment of the invention, the fluid 412 can be an hydraulic fluid. For example, fluid 412 can be formed of mineral oil or water. For purposes of hereinafter describing the invention, it shall be assumed that the fluid 412 is a hydraulic fluid, but it should be understood that the invention is not limited in this regard. For example, in an embodiment of the invention, a pneumatically operated system may be provided instead of a hydraulically operated system. In a pneumatically operated system, the fluid 412 would be air or some other type of gas and a compressor would most likely be used in place of the pump 408 as described herein. Still, the principal of operation of a pneumatically operated system would be similar to the hydraulically operated system described herein.

The control system 400 can be any system that is capable of selectively varying a pressure of the fluid 412 contained within each plenum 414. In an embodiment shown in FIG. 4, a supply of hydraulic fluid is maintained in a reservoir 410. The control system 400 in this embodiment includes a pump 408, a valve 406, a manifold 404, and a control unit 402. One or more sensors 405 can also be included in the system.

The pump 408 is configured to increase or decrease a pressure of fluid 412 communicated to the manifold 404. Fluid communication between the manifold and each plenum 414 is facilitated by conduits 416, 418. In operation, control unit 402 generates one or more signals to control the operation of the pump 408. The control unit also generates one or more signals to control the operation of the valve 406. The operation of the pump and the valve can be varied to cause the fluid pressure in the manifold and each plenum to increase, decrease or remain constant. For example, when pressure is to be increased, the control unit 402 can cause valve 406 to be in an open position so that a fluid pressure increase caused by the pump 408 is communicated to each plenum 414. When pressure in each plenum is to be maintained at a constant level, the valve 406 can be caused by control unit 402 to transition to a closed position and the operation of the pump can be disabled. When in the closed position, the valve 406 maintains whatever is the current fluid pressure in the manifold, conduits 416, 418 and each plenum 414. When pressure is to be reduced in each plenum, the valve 406 can be opened and pump 408 can be operated to create a reduced operating pressure within the manifold, conduits and each plenum. A sensor 405 is advantageously provided to sense the current pressure of hydraulic fluid 412 which is communicated to each plenum 414. Accordingly, the control unit 402 can monitor an output signal from the sensor 405 to determine when the pump has achieved a desired pressure, and/or to ensure that a constant pressure is being maintained by valve 406.

As noted above, the control unit 402 can be configured to control the pressure in each plenum 414 by generating control signals which determine the operation of pump 408 and valve 406. The control unit 402 can optionally perform other functions relating to the operation of gripping pads 116. For example, the control unit can generate one or more lock control signals 422 which control certain pin locking operations as hereinafter described. A position and/or orientation of each of the gripping pads can be controlled in various ways. In one embodiment, the control unit 402 can generate control signals suitable for controlling a position of gripping pads 116. For example, with reference to FIGS. 1-2, the control unit 402 could generate one or more control signals 424 to determine the operation of mechanical linkages 107. If robotic arms are instead used to control the position of the gripping pads as shown in FIG. 3, then the control unit 402 could control the operation of robotic arms 302, 304. Alternatively, the control unit 402 could be a slave unit under the command of a master system controller (not shown). The master system controller in such an embodiment could control the position and orientation of gripping pads 116 in accordance with the inventive arrangements.

The control unit 402 can be any suitable electronic controller which is responsive to one or more control input signals 402. In some embodiments, the control unit 402 can include a central processing unit (CPU), computer memory, and software programming suitable to facilitate the performance of certain grasping operations as described herein. Alternatively, any other suitable arrangement can be used to implement the control unit. The control input signals can be provided directly or indirectly by a master system controller (not shown). Alternatively, the control unit 402 can be operated manually in response to a manual input device (such as a haptic control unit) which is manually operated by a user.

Figure 4:
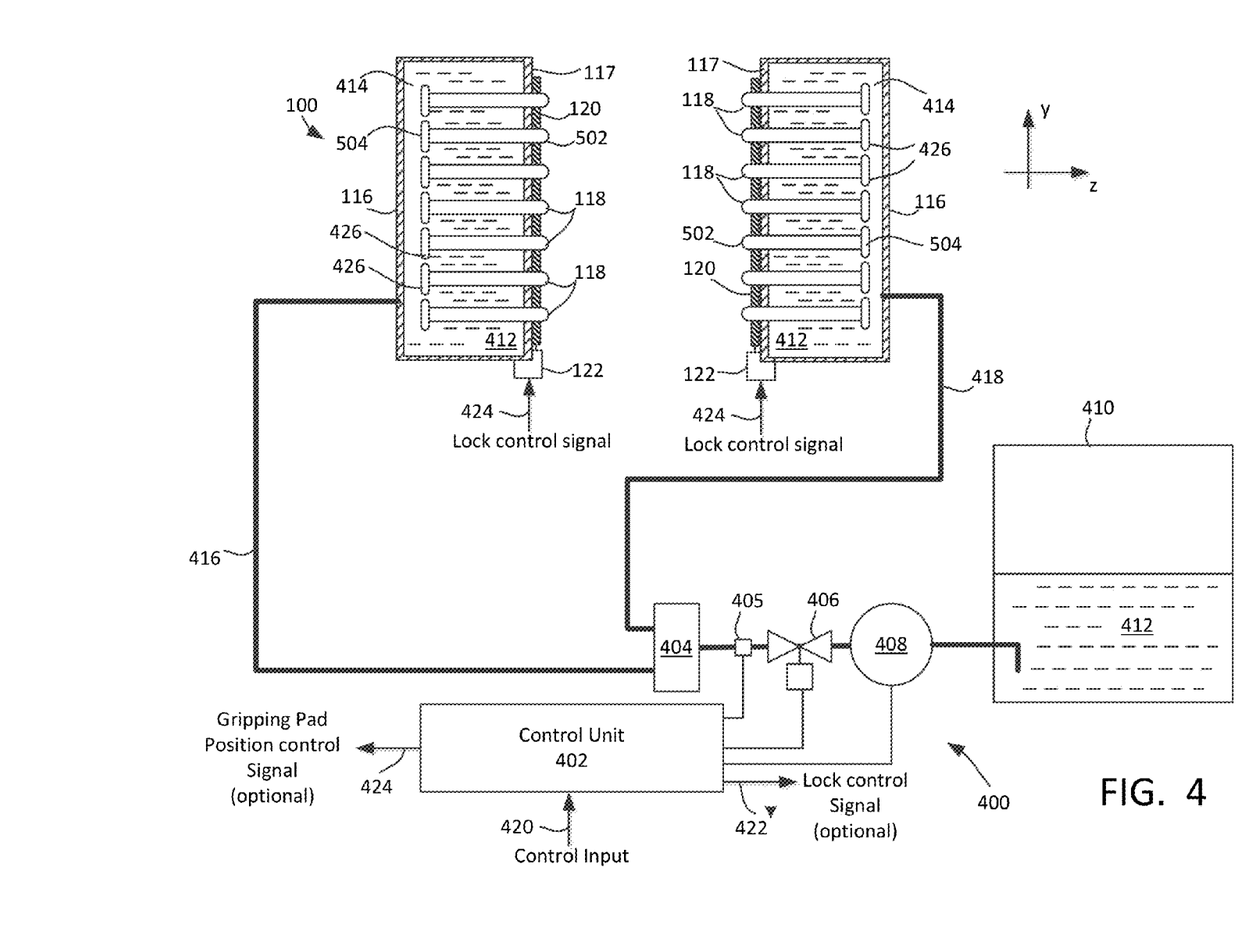
FIG. 4 is a schematic drawing that is useful for understanding the operation of a grasping device.

Referring now to FIGS. 5A-5E, there is provided a series of drawings which are useful for understanding the operation of the system in FIG. 4. In FIGS. 5A-5E, the control system 400 is omitted for greater clarity, but it should be understood that the control system would be used to control the pressure of fluid 412 in each case.

Figure 5A:
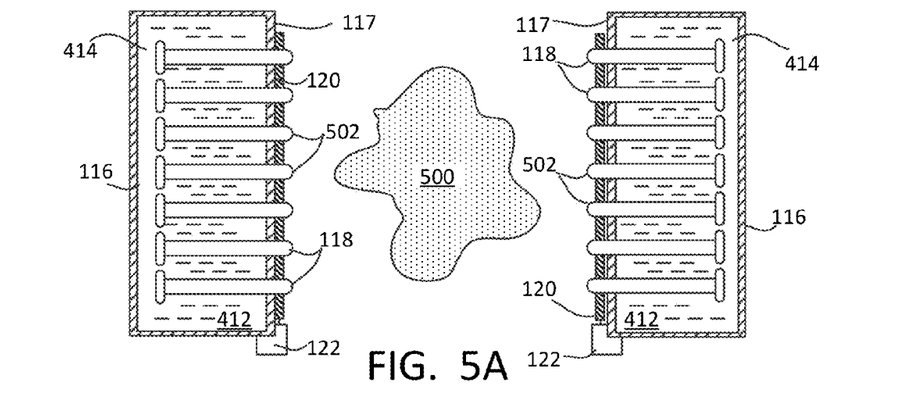
FIGS. 5A-5E are a series of drawings which are useful for understanding a process for grasping an object using a robotic grasping device.

The operation of the gripping pads can begin in FIG. 5A by moving the gripping pads 116 respectively to first and second locations in which a face 117 of one gripping pad is generally opposed from a face 117 of the other gripping pad 116 as shown. As used herein, the term moving can include movement of the pad along any of one, two or three mutually orthogonal axes. In addition, such movement can include rotation of the pad about one, two or three mutually orthogonal axes. If the pads have a planar face 117, then the two faces are preferably positioned so that the faces 117 of the opposing gripping pads 116 are parallel to each other as shown. The position of each gripping pad is initially controlled so that the two faces are spaced apart by some distance. The distance is advantageously selected to accommodate between the two gripping pads an object 500 which is intended to be grasped.

Figure 5B:
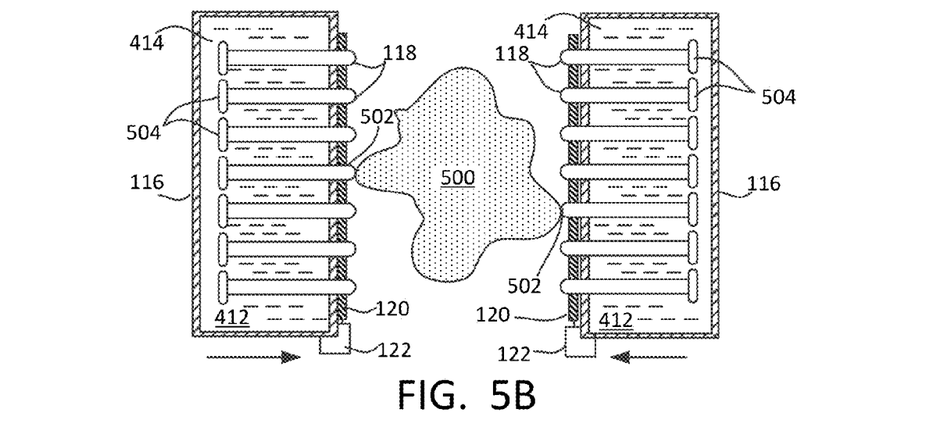

Once the gripping pads are positioned as shown in FIG. 5A, the method continues as shown in FIG. 5B by moving the faces 117 of the two gripping pads closer together. The spacing or distance between the gripping pads is advantageously reduced until the faces 117 of the two gripping pads 116 are approximately adjacent to opposing sides of the object 500 which is intended to be grasped. As explained below in further detail, the optimum spacing between the pads can vary depending upon a particular grasping scenario.

Figure 5C:
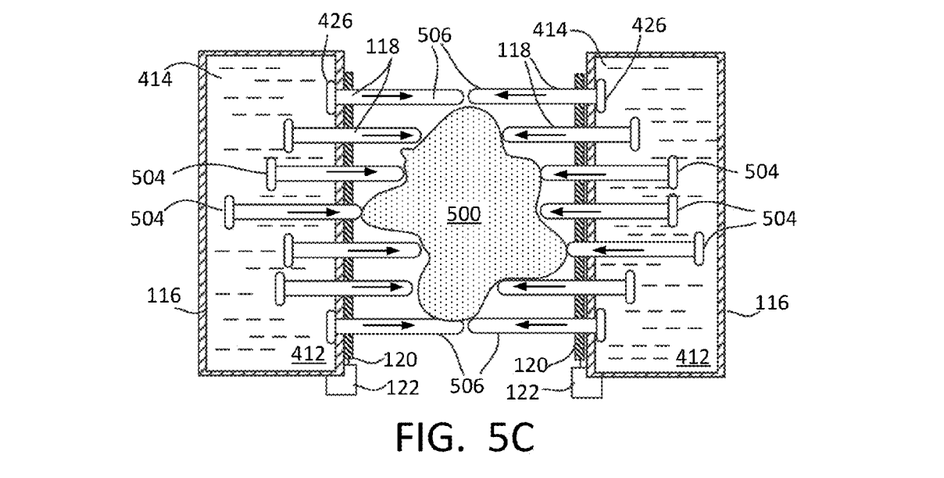

Once the gripping pads have been positioned adjacent to the object, the process then continues as shown in FIG. 5C. In particular, the process continues by extending the plurality of pins 118 from or through each face 117 in a direction toward face 117 of the opposing one of the gripping pads. In other words, the pins are caused to move from a first position where the elongated length of each pin is predominantly disposed within each gripping pad (and little or no portion of the pin extends from the face 117), to a second position where a greater portion of the elongated length protrudes from the face 117.

In the embodiment shown in FIG. 5A-5C, the extension of the pins is caused by increasing a pressure of fluid 412 within each plenum 414. The pressure of the fluid acts upon the proximal ends 504 of each pin, and this pressure generates a force which urges the pins out of the plenum as shown. The force advantageously causes the pins to extend out of the plenum until they encounter an object (such as a pin on the opposing gripping pad or the object 500) or the pin reaches its maximum extension as delimited by the retainer. Consequently, the extension distance for each pin 118 is determined responsive to a resistance encountered by each of said plurality of pins as a result of said extending. This can result in a variation in the extension distance of a plurality of the pins 118 and this variation will depend on the contours of the object which is being grasped. As a result of these operations, an object-defined gripping contour will be defined by the distal ends of the plurality of pins. The object-defined gripping contour will extend in the x and y direction across the surface of the gripping pad and will vary in a z direction in accordance with a pin extension position. Accordingly, the object-defined gripping contour can outline a shape which is essentially a conjugate of the object to be grasped.

It should be appreciated that the retention of the object 500 within the grasp of the gripping pads 116 does not necessarily require that the pins 118 exert substantial force upon the object in order to grasp same. Instead, the conjugate shaped object-defined gripping contour can be sufficient to retain the object within the grasp of the gripping pads without exerting significant pressure by each pin. This is possible because the object is essentially captured in the conjugate shape which is defined by the gripping-contour. This arrangement facilitates a gripping system which can grasp very delicate objects in a very secure way, but without potential for breakage. Also, the gripping pads 116 can be designed so that an area of face 117 where the pins are distributed is generally larger than an object to be grasped. In such embodiments certain pins 506 (e.g., those located around a periphery of an object which is grasped) can completely surround or capture the grasped object around its peripheral edges as shown in FIG. 5C. In such embodiments, the object can be grasped essentially without exerting any frictional forces on the sides faces of the object.

From the foregoing it can be understood that it is not necessary for the pins to exert significant amounts of pressure upon the object to be grasped. Accordingly, when the pins are to be extended, the pressure within each plenum can be made just sufficient to urge the pins out of the plenum at a suitable rate of extension. The exact amount of plenum pressure required for this purpose can be determined based on a particular design of the grasping device.

Figures 5D, 5E:
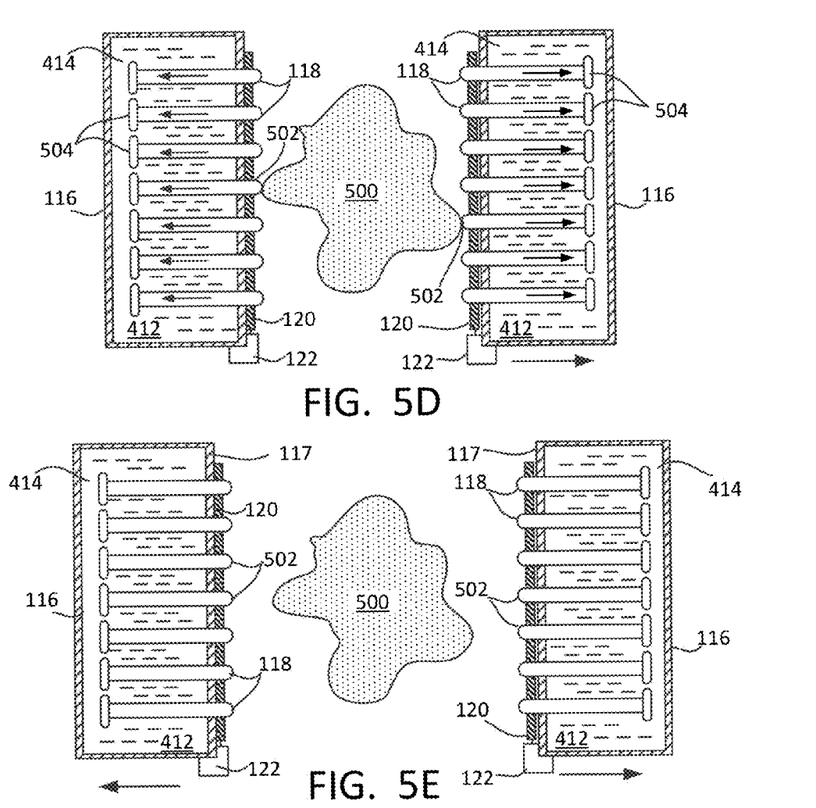

The process continues as shown in FIG. 5D in which a fluid pressure within plenums 116 is reduced. The fluid pressure is preferably reduced to a sufficient extent to cause pins 118 to retract into their respective plenums. The reduced pressure of the fluid as compared to the external environment (outside the plenum) acts upon the proximal ends 504 of each pin, and this reduction in pressure generates a force which draws the pins into the plenum as shown. Stated differently, it could be said that the relatively higher pressure outside the plenum urges the pins into the plenum. This action releases the object from the grasp of the gripping pads. Subsequently, in FIG. 5E, the pads can be retracted and moved away from the object to continue on with other grasping tasks.

As explained above with reference to FIG. 5B, the faces 117 of the two gripping pads are moved closer together until the faces 117 of the two gripping pads 116 are approximately adjacent to opposing sides of the object 500 which is intended to be grasped. Notably, the optimum spacing between the pads can vary depending upon a particular grasping scenario. For example in some grasping scenarios it can be advantageous to space the gripping pads so that one or more distal ends of pins 118 can be touching or nearly touching the object 500 as shown in FIG. 5B. However, the invention is not limited in this regard and a different spacing between the gripping pads can also be selected.

Figure 8:
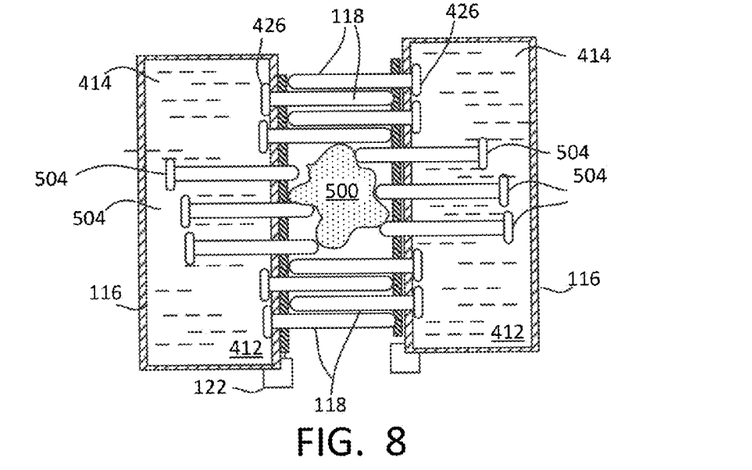
FIG. 8 is a drawing that is useful for understanding an alternative method by which the grasping device can be used to grasp an object.

For example, it can be advantageous in some scenarios to limit the minimum spacing between the two gripping pads so that the distal ends 502 of pins 118 on one gripping pad 116 do not extend past the distal ends of pins on the opposing gripping pad when the pins in each gripping pad are fully extended. In other scenarios it can be advantageous for the spacing between the gripping pads 116 to be chosen to be just sufficient to allow the distal ends 502 of pins on one gripping pad to touch the distal ends of the pins on the opposing gripping pad when both sets of pins are fully extended. In another scenario shown in FIG. 8, it can be advantageous to arrange the opposing gripping pads 116 so that the pins in the opposing gripping pads are laterally offset in position. This can be accomplished by offsetting the position of the gripping pads as shown in FIG. 8, or by providing an asymmetric distribution of the pins on the opposing gripping pads. In such a position, one or more pins on a first gripping pad can be allowed to mesh with one or more pins of the second gripping pad. In other words, the pins on one pad can be aligned with gaps between the pins on the opposing pad to allow for precise meshing of the pins. This arrangement can create smaller gaps between pins and can be useful in certain grasping scenarios.

Figure 6A:
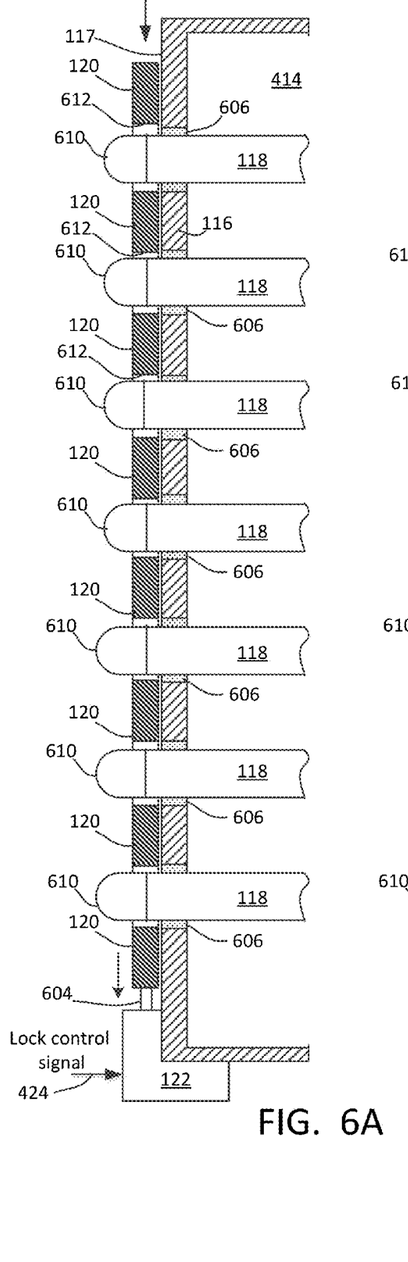
FIGS. 6A and 6B are a series of drawings that are useful for understanding a mechanical locking system for restraining a plurality of pins associated with a robotic grasping device.
Figure 6B:
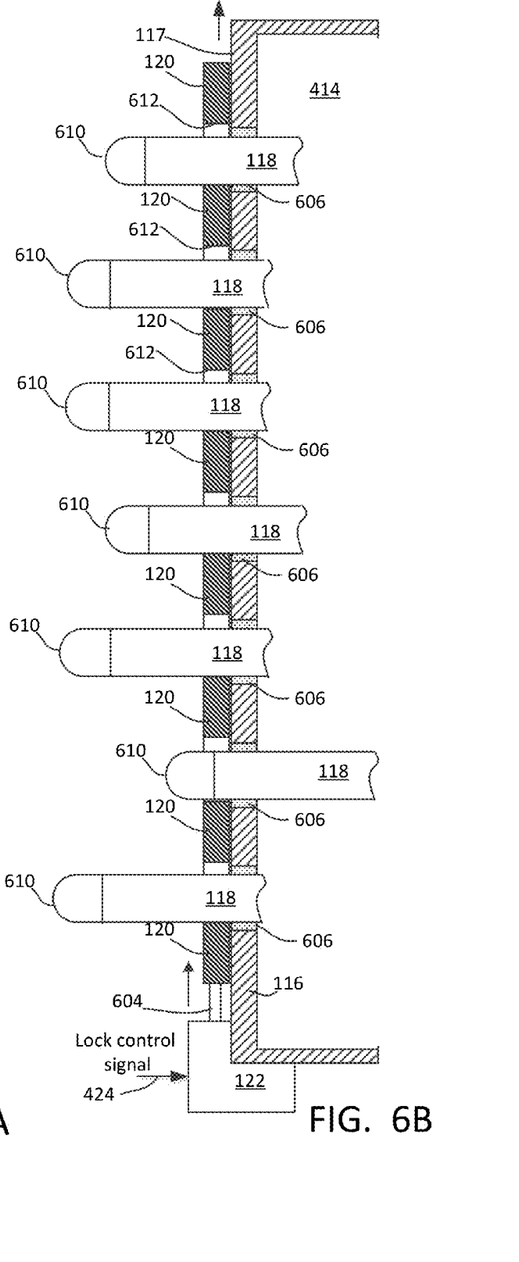

During a period of time when an object is grasped between the gripping pads 116, the position of the pins 118 can be maintained by simply sustaining the hydraulic pressure within each plenum 414. However, pressure exerted upon one pin can result in a change of fluid pressure within the plenum 414. This change of pressure can result in a change of position of other pins within the same gripping pad 116 as the pressure of fluid 412 is varied. Accordingly, it can be advantageous in some scenarios to provide a locking mechanism whereby the pins 118 can be locked in their extended position, in engagement with an object which is grasped. FIGS. 6A and 6B illustrate one example of such a locking mechanism. As illustrated therein, a locking plate 120 is provided at a face of each gripping pad. The locking plate includes a plurality of pin apertures 612 through which pins 118 can pass unobstructed when the locking plate is in an unlocked position shown in FIG. 6A. When the pins are to be locked, an actuator 122 can be used to shift a position of the locking plate 120 in the direction of the arrows, to a locked position shown in FIG. 6A. Any suitable actuator can be used for this purpose. For example, the actuator can be an electro-mechanical device, such as a solenoid which acts upon the locking plate by way of a link 604. A lock control signal 424 for the actuator can be provided by the control unit 402. When the locking plate is moved to this locked position, the side wall of each pin aperture 612 in the locking plate is caused to frictionally engage the side wall of each pin 118. This frictional engagement can be used to lock the pins 118 in position. When movement of the pins 118 is once again desired, the locking plate can be returned to its unlocked position by once again activating the actuator and moving the locking plate in the direction shown by the arrows in FIG. 6A. Alternatively, a spring member (not shown) can be used to urge the locking plate back to its unlocked position. Also shown in FIG. 6A are rubberized pin tips 610 which can be formed of rubber or polymer to increase a frictional engagement with an object to be grasped.

Figure 7:
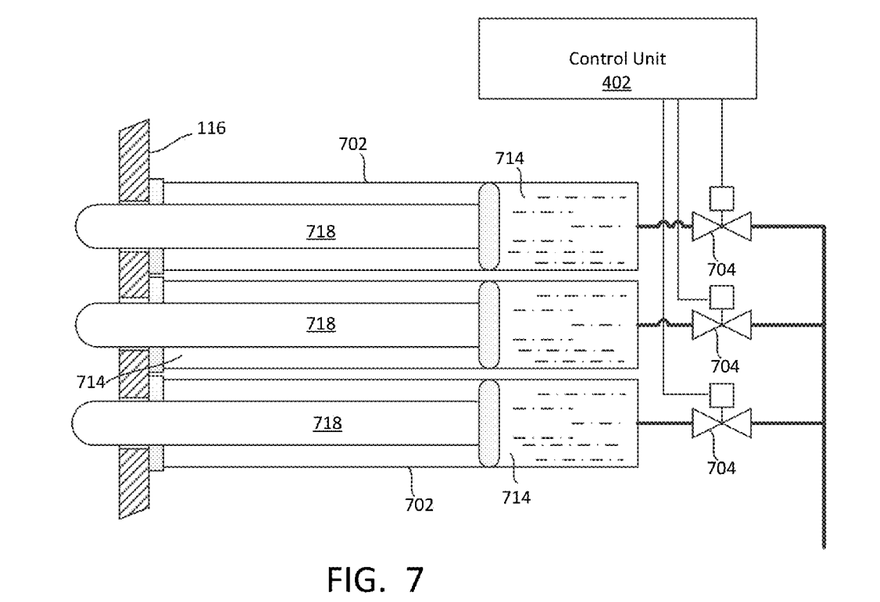
FIG. 7 is a drawing that is useful for understanding an alternative embodiment of hydraulic control system that is used for controlling the extension and retraction of pins a grasping device.

In an alternative embodiment of the invention, interaction among the pins can be minimized by providing separate plenum chambers for each pin. Such an arrangement is illustrated in FIG. 7, which shows that each pin 718 can have its own plenum 714 disposed within a plenum housing 702. In such an embodiment, a pressure within each plenum 714 can be maintained independently by a valve 704. Each valve 704 is operated under the control of control unit 402 as previously described. When the valves 704 are open, fluid under pressure from a pump (e.g. pump 408) may be communicated to each of the plenums 714. However, when the valves 704 are closed, this action isolates a plenum for each pin from the plenums of other pins 718. In this isolated condition, a force exerted on one of the pins 718 can increase the pressure within a corresponding plenum, but it will have no effect on the fluid pressure in the plenums associated with a remainder of the pins 718. Accordingly, when an external force is exerted on one pin 718, the remaining pins are not caused to move.

The extension of the pins 118, 718 has been generally described herein as occurring in response to a force produced by fluid pressure. However, it should be understood that the invention is not limited in this regard. In place of a fluid pressure based activation system, it is possible that one or more of the plurality of pins could be extended by alternative means. For example, an electro-mechanical actuator, such as a solenoid, could be used for each pin to cause it to extend. The force exerted by the electro-mechanical activators in such embodiments can be selected so that it is sufficient to push the pins out of each gripping pad when grasping an object, and to retract the pins into the gripping pad upon completion of a grasping task. As noted above, the pins need not exert a significant frictional force upon the object because the object-defined gripping contour can be sufficient to grasp the object. Still, in other embodiments a substantial force can be exerted by each pin for creating a frictional engagement with the object.

Figure 9:
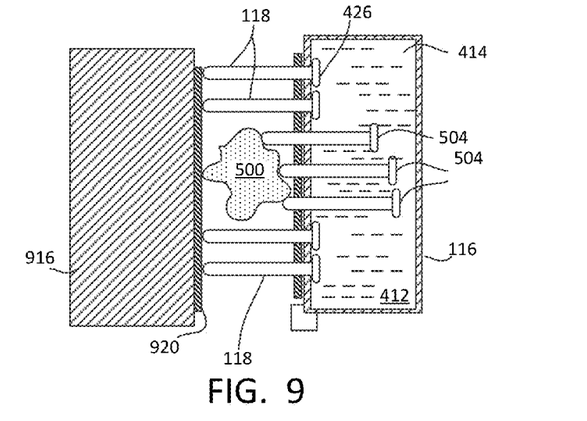
FIG. 9 is a drawing that is useful for understanding how a passive gripping pad and a an active gripping pad can be used to grasp an object.

The invention shown in FIGS. 1-7 has been described as including two gripping pads 116 which are substantially identical. As explained, each gripping pad in such arrangements include a plurality of pins which extend from a face 117. Still, it should be appreciated that the invention is not limited to such an embodiment. Instead, the invention can be practiced with a first gripping pad 116 as previously described, and a second gripping pad which is essentially passive, meaning that it does not have extendable pins. In such an arrangement an object can be grasped between the two pads as shown in FIG. 9. As illustrated therein, a passive gripping pad 916 can include a surface on which a friction membrane is provided to facilitate gripping an object, but the grasping function is primarily performed by the gripping pad 116.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for grasping an object, comprising:
   moving first and second gripping pads respectively to first and second locations in which a first face of the first gripping pad is opposed from a second face of said second gripping pad and spaced apart a distance, where the first gripping pad comprises a first plurality of pins each having a position on the first face which is offset from a position of a corresponding pin of a second plurality of pins of the second gripping pad;
   extending a first plurality of pins from at least said first face of the first gripping pad in a direction toward said second face of the second gripping pad;
   independently determining an extension distance for each of said first plurality of pins responsive to a resistance encountered by each of said first plurality of pins as a result of said extending; and
   as a result of said independently determining step, producing an object-defined gripping contour formed by distal ends of first pins of said first plurality of pins and a retainer wall surrounding a periphery of the object defined by meshed second pins of the first and second plurality of pins.

2. The method according to claim 1, wherein a proximal end of each of said first plurality of pins opposed from said distal end is exposed to fluid pressure within at least one internal plenum of said first gripping pad to cause said extending.

3. The method according to claim 2, wherein said proximal end of each of said first plurality of pins is exposed to said fluid pressure within a single common plenum of said first gripping pad.

4. The method according to claim 2, further comprising restraining said first plurality of pins at said extension distance to maintain said object-defined gripping contour.

5. The method according to claim 4, wherein said restraining further comprises misaligning a locking plate through which each of said first plurality of pins extends.

6. The method according to claim 2, further comprising:
   exposing a proximal end of a first of said first plurality of pins to said fluid pressure in a first plenum;
   exposing said proximal end of a second of said first plurality of pins to said fluid pressure in a second plenum; and
   isolating said first plenum from said second plenum to prevent a pressure variation in said first plenum from causing a pressure variation in said second plenum.

7. The method according to claim 6, wherein said isolating step is performed after said extending to independently maintain each said first and second plurality of pins at its respective extension distance.

8. The method according to claim 1, further comprising producing said resistance by causing said distal ends of said first plurality of pins to encounter an object which has been disposed between said first and second faces.

9. The method according to claim 1, further comprising distributing two or more of said first plurality of pins in a first direction extending across said first face, and distributing two or more of said first plurality of pins in a second direction extending across said first face, wherein said first direction is generally transverse to said second direction.

10. The method according to claim 9, wherein said object-defined gripping contour is a three-dimensional contour which is determined by a contoured surface of said object.

11. The method according to claim 1, further comprising:
   extending the second plurality of pins from said second face in a direction toward said first face;
   independently determining an extension distance for each of said second plurality of pins responsive to a resistance encountered by each of said second plurality of pins as a result of said extending; and
   as a result of said independently determining step, producing a second object-defined gripping contour formed by distal ends of said second plurality of pins.

12. The method according to claim 1, wherein said first and second locations are respectively selected to be directly adjacent to opposing sides of an object to be grasped.

13. The method according to claim 1, further comprising retracting said first plurality of pins through said first face and into said first gripping pad when a grasped object is to be released.

14. A system for grasping an object, comprising:
a first gripping pad comprising a first plurality of pins;
a second gripping pad comprising a second plurality of pins each having a position thereon which is offset from a position of a corresponding pin of the first plurality of pins on the first gripping pad;
at least one mechanical linkage responsive to a control system and configured to move at least one of said first and said second gripping pads to a location in which a first face of the first gripping pad is opposed from a second face of said second gripping pad and spaced apart a distance;
a fluid system configured to
 cause the first plurality of pins to extend from at least said first face of the first gripping pad in a direction toward said second face of the second gripping pad, and
 independently determine an extension distance for each of said first plurality of pins responsive to a resistance encountered by each of said first plurality of pins as a result of said extending; and
wherein said first plurality of pins and said fluid system are configured so that when extended (a) a plurality of distal ends of first pins of said first plurality of pins have an object-defined gripping contour and (b) meshed second pins of the first and second plurality of pins form a retainer wall surrounding a periphery of the object.

15. The system according to claim 14, wherein said fluid system is further configured to expose a proximal end of each of said first plurality of pins opposed from said distal end to fluid pressure within at least one internal plenum of said first gripping pad to cause said extending.

16. The system according to claim 15, wherein said proximal end of each of said first plurality of pins is exposed to said fluid pressure within a single common plenum of said first gripping pad.

17. The system according to claim 15, further comprising at least one locking component configured to restrain said first plurality of pins at said extension distance to maintain said object-defined gripping contour.

18. The system according to claim 17, wherein said restraining component comprises a locking plate through which each of said first plurality of pins extends.

19. The system according to claim 15, wherein two or more of said first plurality of pins are distributed in a first direction extending across said first face, and two or more of said first plurality of pins are distributed in a second direction extending across said first face, wherein said first direction is generally transverse to said second direction.

20. The system according to claim 15, wherein said object-defined gripping contour is a three-dimensional contour which is determined by a contoured surface of said object.

\* \* \* \* \*